July 8, 1924.

C. S. BURTON

SOIL PULVERIZER AND SEEDER

Filed Feb. 8, 1918

Patented July 8, 1924.

1,500,437

UNITED STATES PATENT OFFICE.

CHARLES S. BURTON, OF OAK PARK, ILLINOIS.

SOIL PULVERIZER AND SEEDER.

Application filed February 8, 1918. Serial No. 215,968.

*To all whom it may concern:*

Be it known that I, CHARLES S. BURTON, a citizen of the United States, residing at Oak Park, in the county of Cook and the State of Illinois, have invented certain new and useful Improvements in a soil Pulverizer and Seeder, of which the following is a specification, reference being had to the accompanying drawings, forming a part thereof.

The purpose of this invention is to provide an apparatus for excavating, disintegrating and pulverizing agricultural soil for reducing it to any desired degree of fineness to make it suitable for seed to be deposited in it, and in a suitable case to sterilize the pulverized soil, and in a suitable case to intermix with the pulverized soil a suitable fertilizer, and to deposit seed in the pulverized soil, all of the above mentioned operations and processes being performed during one continuous passage of a machine over the field. It consists in the elements and features of construction shown and described as indicated in the claims.

The structure illustrated in the drawings comprises a main supporting frame 1, which is carried on wheels, 2, 2, positioned for tracking in the bottom of the furrow, and upon caster wheels, 3 and 4, at opposite sides of the rear end, the wheel, 3, being designed to travel upon the land side, that is upon the unplowed soil, and the wheel, 4, being designed to travel upon the plowed soil and being therefore of considerable breadth and substantially in the form of a roller. This main frame 1, is designed to be propelled over the field by means of a truck, 6, which, so far as indicated, is a pole truck, only the connection being shown, and any means of propelling it may be employed. Upon the frame, 1, there is mounted an engine, 5, which supplies the power for operating the excavating and pulverizing devices, and, as illustrated, is not concerned in the traction or propulsion of the machine over the field; but it is not to be understood that it is inconsistent with the invention that the same engine should furnish power for both traction and operation of the mechanism.

At the forward end of the frame, 1, there is mounted the main excavator or plowing device, A, which is substantially an assemblage of rotary cutters of the nature of circular saws, 10, mounted obliquely to the axis of rotation so as to operate after the well known manner of "wobbling" saws, that is, each cutting a channel or kerf in the soil as wide as the distance between the two directly transverse planes between which the obliquely-positioned saws are contained. The specific form of this excavator, A, shown in the drawings, comprises a drum, 11, upon which the saws, 10,—each being annular in form with the central opening having a diameter equal to the outside diameter of the drum or a trifle more,—are mounted, being spaced apart thereon by cylindrical spacers, 12, which are each oblique to the axis so as to cause the saws to stand obliquely to the axis for the wobbling effect described, the extreme saws at the opposite ends being spaced from the opposite heads or flanges of the cylinder, 11, by spacers, $12^a$, having one side oblique to the axis for abutting against the saw and the other side at right angles to the axis for abutting against the flange of the drum head. The heads, $A^3$, $A^3$, of the drum are provided with inwardly-projecting annular flanges, $a^3$, $a^3$, which telescope within the ends of the drum for affording lodgment for the latter on the heads, and the heads are connected together by longitudinal strain rods, $A^4$, having their heads at one end outside the drum head at that end, and having at the other end nuts, $a^4$, outside the other drum head which may be screwed onto the strain rods for clamping the drum firmly together, causing the saws to be rigidly clamped between the spacers by the circumferential margins of the drum heads engaging the outside spacers. The drum is journaled by means of its said heads upon a shaft, 15, having on the end portions outside the drum pinions, 16, 16, which engage segment racks, 17, 17, which form parts of the rigid frame, 1, extending between the upper and lower bars of said frame as hereinafter more particularly described. Said shaft, 15, has also on one end a worm gear, 19, engaging a worm shaft, 20, which is journaled on the segment at that end so as to be rotated and to rotate the shaft, 15, to cause the pinions thereon engaging the segments to travel up and down in said segments for raising and lowering the drum. The drum is also journaled, by means of its heads having at their center outwardly-projecting hubs or sleeves in radius arms, 21, 21, which are fulcrumed on the frame about the axis of the shaft, 22, from which power is transmitted for rotating the drum as hereinafter more particularly explained. The worm shaft, 20, is connected by a toggle-joint at 20$^a$ with an operating shaft, 20$^b$, which extends up alongside the driver's seat and is there provided with a hand wheel, 20$^c$, for rotating it to raise and lower the drum.

The excavator, A, is driven by the train hereinafter described, being rotated preferably upward in front so that the resistance of the soil to the disintegrating attack of the excavator teeth cannot convert its action into a mere lifting of the machine, as might be the tendency in the case of a refractory soil if the opposite direction of rotation were employed. In this structure as illustrated, the remainder of the mechanism is accommodated to this direction of rotation of the excavator, but the change is necessary to accommodate a downward rotation in front will be obvious. A further reason, however, for rotating the excavator upward in front is to cause it to discharge the detached and excavated soil upwardly, so that it may be deflected rearwardly over the excavator to the further conveying and pulverizing devices. A shield and deflector, 26, is mounted above the excavator, extending from a point at the front near the level of the axis of the excavator, thence back in an upwardly and rearwardly curved direction so as to gather and direct rearward over the excavator, the soil detached by the latter. A wire brush, 27, or other form of cleaner is mounted for rotation at the rear side of the excavator, somewhat above the level of the axis of the latter, such brush having its circumferential periphery wiping the excavator teeth, the wire or equivalent brushing elements operating between the teeth and stripping off the soil therefrom with a movement tending to throw the soil into the stream which is discharged rearward over the excavator under the deflector and shield. 30 is a deflecting blade and cleaner for the brush, 27. It is mounted in a rearwardly and downwardly inclined position with its forward edge protruding into the brush above the level of the axis of the latter, so as to wipe the wire as the brush revolves downward at the rear side, and so as to direct the soil wiped off by the brush down rearward with the stream which is delivered off from the upper side of the brush. The lower rear edge of the deflector and wiper, 30, overhangs the foremost member of the first pair of pulverizing rolls hereinafter described.

The pulverizing devices in addition to the excavator and wiper comprise several pairs of pulverizing rolls, 13, 14, 13$^a$, 14$^a$, 13$^b$, 14$^b$. The number of pairs required is dependent upon the rate of travel of the machine over the ground, and the speed of rotation of the pulverizing rolls; but it is considered impracticable to operate the pulverizing rolls at a peripheral speed much greater than about 20 feet per second; and as it is desired to pass all the soil excavated and delivered to the rolls to them or some of them in streams not more than one-fourth of an inch thick, in order to reduce the soil to proper fineness, it will be seen upon computation that for every foot of advance of the machine over the field, cutting a furrow six inches deep, there will be removed and fed back to the rolls the equivalent of a sheet of soil one-quarter of an inch thick and twenty-four feet long; and if the machine advances at the rate of two miles per hour, or approximately three feet per second, the soil detached will amount to a sheet or ribbon 72 feet long and one-quarter of an inch thick per second, which will require four pairs of rolls revolving so as to pass the soil through them at the rate of 18 feet per second. It is estimated that the frusto-conical rolls, hereinafter described more particularly, both rolls of each pair having the same rotary speed, and having therefore the same circumferential speed at the middle point of their length, will pass the soil through between them at a speed averaging throughout the length of the rolls the full circumferential speed of the rolls at their middle points. I have therefore provided four pairs of these frusto-conical pulverizing rolls, one pair behind another, all behind the clearing brush, 27, each pair designed to deliver a stream or sheet of pulverized soil down into the track or furrow from which the same has been removed by the excavator, the successive sheets delivered by the pairs of rolls located successively one behind another, forming superimposed layers, and of course more than filling the furrow or ditch excavated because of the lightness of the pulverized soil in comparison with the compact earth attacked by the excavator.

To cause the disintegrated and pulverized soil to be delivered to the successive pairs of pulverizing rolls in proper quantity to be handled by each pair, there is mounted above the entire system of pulverizing rolls an endless rake device consisting of chains, 23, 23, traveling about sprocket wheels, 24, 24, on shafts, 25 and 26, which are journaled transversely of the direction of travel of the machine, the two chains being connected by, and carrying with them in their travel, sweeps, 47, which at the course of the lower and rearward traveling ply of the chains, have their lower edges sweeping within a very short distance of the upper circumference of the pulverizing rolls, so that as the sweeps come down around the forward sprocket wheels into the stream of disintegrated earth which pours over the top of the excavator, they may engage and advance the stream of soil and spread it in a substantially uniform layer or stream above all the rolls, the depth of such layer being within the pulverizing capacity of the rolls, which is such that the quantity thus deposited may be taken through the rolls as fast as it is brought to them by the sweeps, the entire quantity engaged in advance of each sweep being deposited by the time the sweep has passed the last pair of rolls.

Preferably there is provided at the rear of the entire system of pulverizing rolls a compacting roller, 45, which is mounted in a frame for limiting the rising and falling movement so as rest at all times with its full weight, and any additional pressure which may be provided, upon the original pulverized soil delivered to the rollers, thus compacting the soil to any desired extent determined by the weight and pressure of the rollers, 45. As illustrated, the roller, 45, is journaled in the rear end of a frame which is provided with two parallel bars, 36, 36, which are fulcrumed on the main frame at a forward point, 37. A rear crossbar, 41, of the main frame has projecting rearwardly from it a lug, 41ª, through which there is screwed an adjusting screw, 42, which engages a cross-bar, 38, of the roller frame, and which affords a stop against the upward swinging of that frame. The driver's seat, 50, is carried at the forward end of a frame comprising parallel bars, 51, 51, pivoted upon the uprights of the main frame at the rear end and extending above the side bars, 36, 36, respectively of the roller frame. The roller frame side bars and said seat frame side bars being connected by struts, 52, which may be adjusted along said bars, a plurality of bolt holes, 53, being provided in the seat frame bars and the roller frame bars for that purpose. By this expedient it will be seen that the weight of the driver on the seat operates upon the roller frame to weight the roller to a degree which can be varied by shifting the struts for increasing the effective lever length of the arm of the seat frame as that of the lever arm of the roller frame is diminished, and vice versa.

Figure 7:
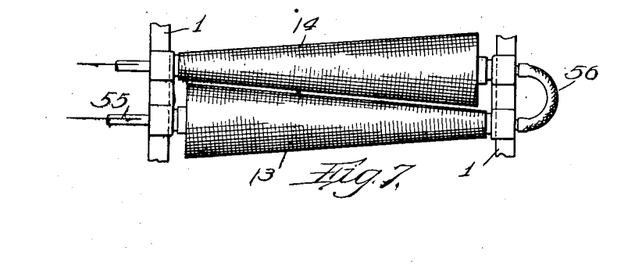
Figure 7 is a plan view of two consecutive pulverizing views.

The mechanism above described is driven by a suitable motor, 5, mounted as stated on the main frame and which may be either an internal combustion engine, or a steam engine; and in either case the exhaust gas or steam may be employed for heating any desired portion, or the whole, of the mechanism which comes in contact with the soil, or for directly heating the soil itself, for the purpose of destroying vegetable germs,— weed seeds,— that is, for sterilizing the soil more or less before the seed to be sown is deposited in it. As illustrated, the exhaust pipe, 70, of the motor is caused to discharge directly into the casing in which all the entire soil-pulverizing mechanism is contained, so as to heat the soil directly, while at the same time more or less heating all the parts of said mechanism which come in contact with the soil. Other means of connecting the exhaust gases or steam from the motor for sterilizing the soil will be obvious, which will be within the scope of this part of the invention. It will be observed that the stream of soil delivered from between the rear pair of rolls forms the top layer, and this layer will be thick enough to contain seed such as small grain or any seed which is customarily sown broadcast and harrowed or rolled in; and in many cases it will be sufficient to sterilize this top layer only, since the seed deposited in this layer will germinate so far in advance of any vegetable germs which may be in the lower layers, that the latter will be very little liable to usurp the soil. In other cases and in some soils and for some seeds, it may be preferable to sterilize the second layer, either with or without sterilizing the top layer; and in still other instances the third layer may be sterilized to advantage. When it is desired to limit the sterilization to one layer or another, convenient means for this purpose will consist in causing the exhaust gas or steam to be discharged within the rolls of the pair by which the particular layer to be sterilized is deposited, by providing the rolls of that pair with hollow axles, and connecting the exhaust pipe to one of said axles, and connecting the two axles by return bend at the opposite end from that at which the exhaust pipe connection is made to one of them. This expedient is shown in Figure 7, wherein 55 is the exhaust pipe from the motor, and 56 the return bend connecting the two axles at the opposite end from that at which the exhaust pipe is connected to one of them.

Figure 1:
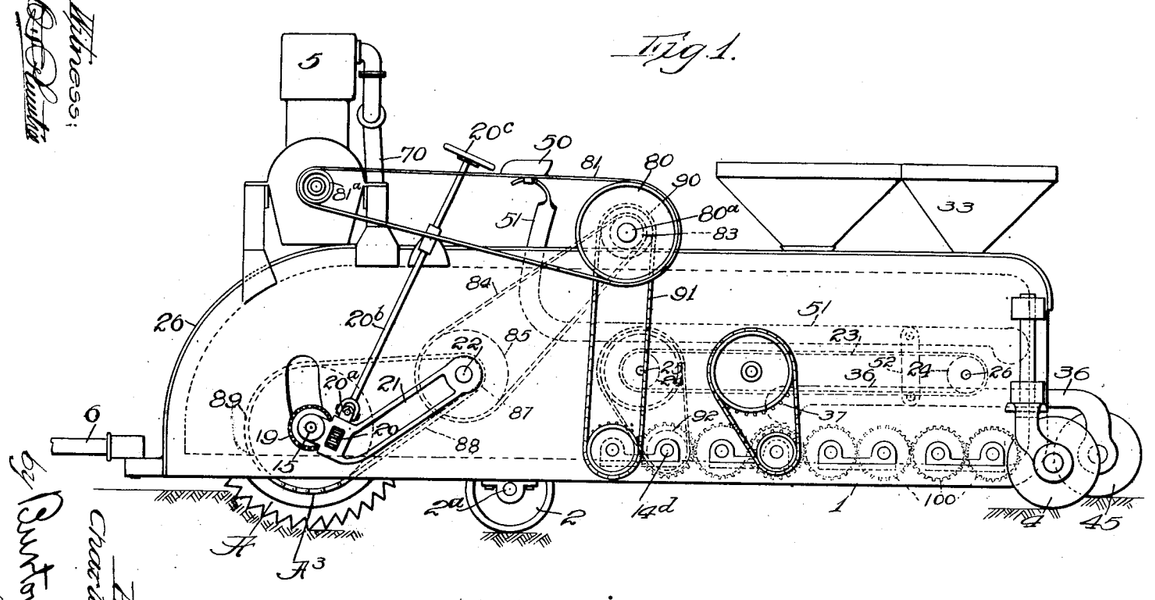
Figure 1 is a side elevation of the structure embodying this invention.
Figure 2:
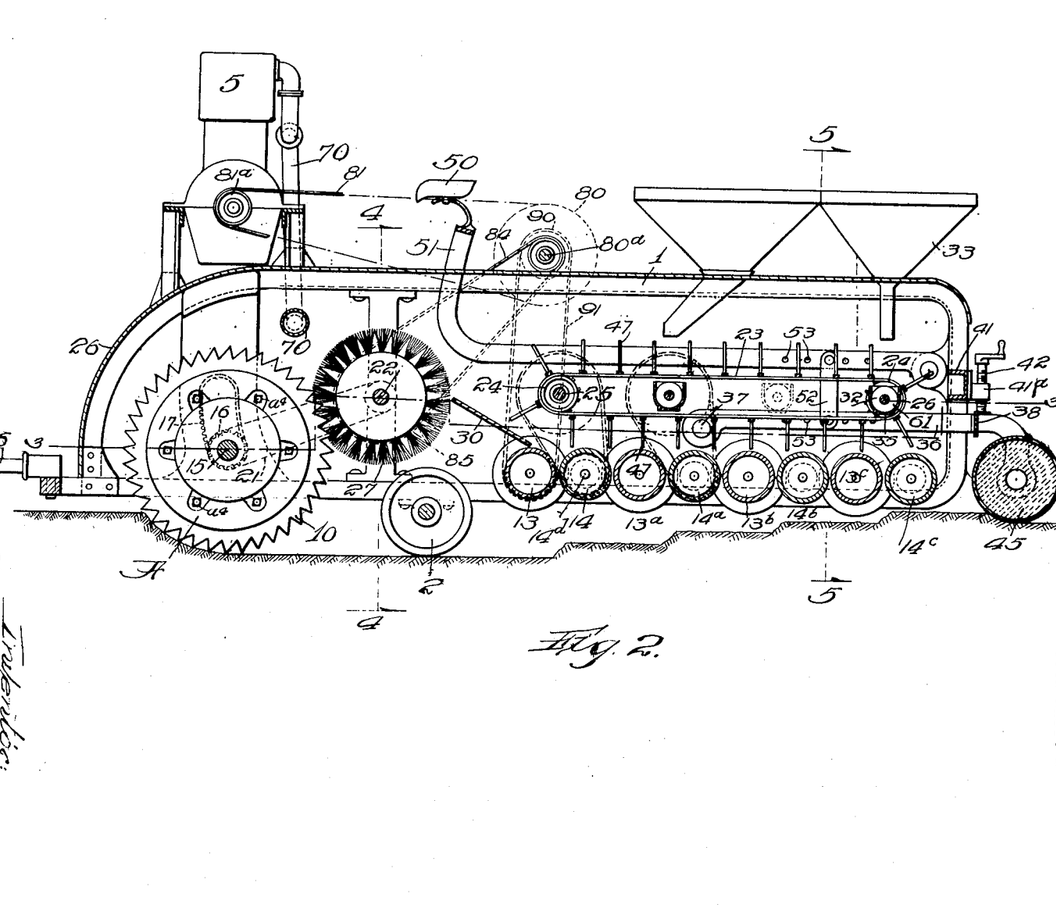
Figure 2 is a longitudinal vertical medial section of the same.
Figure 3:
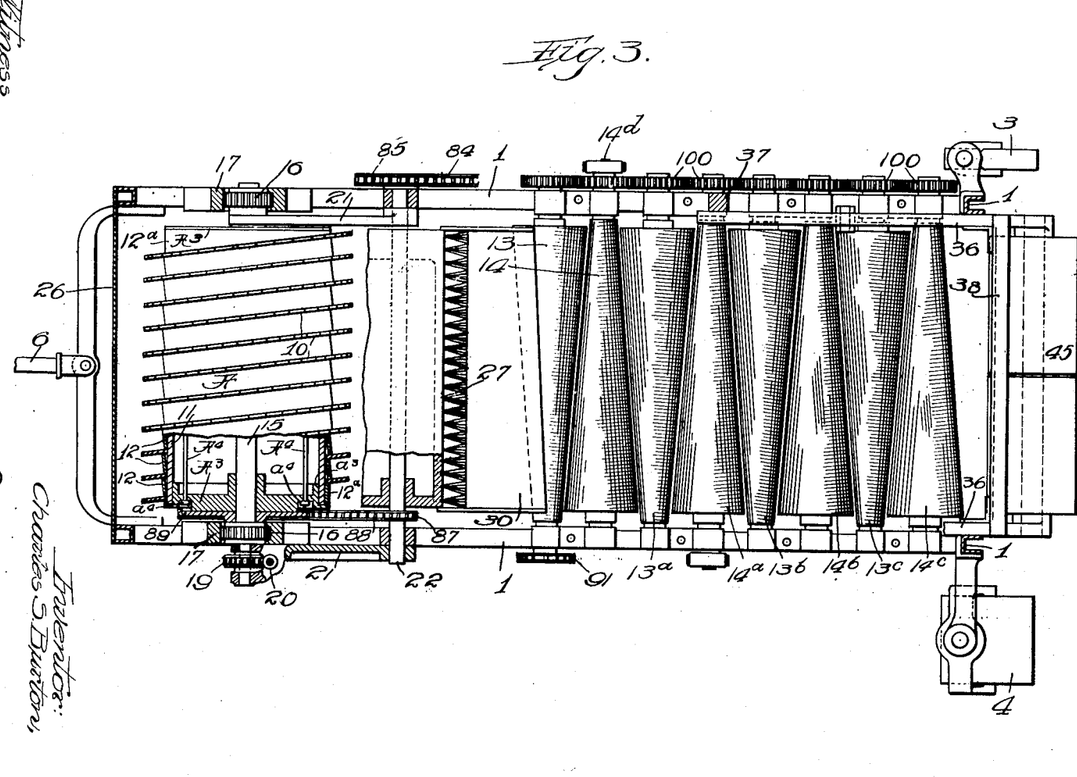
Figure 3 is a substantially horizontal section at the line 3—3 on Figure 2 with the exception that the excavator drum and cleaning brush are shown in section only for a short portion of their length and the remainder in plan view.
Figure 4:
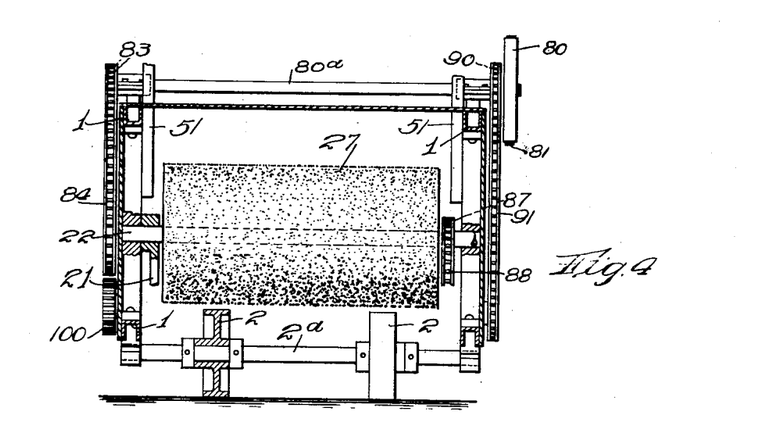
Figure 4 is a section at the line 4—4 on Figure 2.
Figure 5:
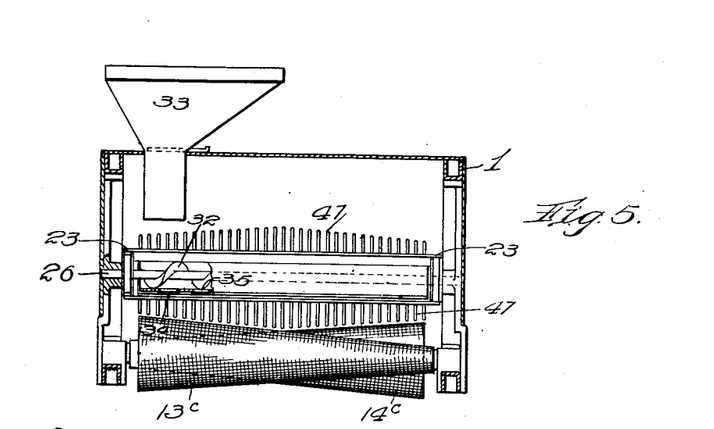
Figure 5 is a section at the line 5—5 on Figure 2.
Figure 6:
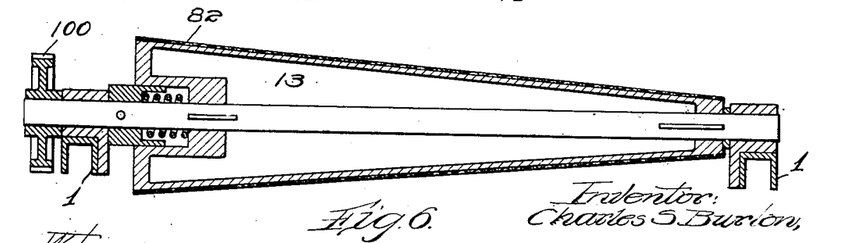
Figure 6 is an axial section of one of the pulverizing rolls.

For the purpose of introducing fertilizer into the pulverized soil before seeding, there is provided a conduit, 61, extending between the upper and lower plies of the rake chains, 23, and operating at the lower side for delivering downward through the rakes onto the stream or layer of soil which is being delivered by them to the last pair of rolls. A feed-screw, 32, in the conduit feeds the fertilizer therethrough from the end at which it is discharged into the conduit through a hopper, 33, the rate of supply being regulated to the rate of escape through the apertures in the bottom of the conduit so that the fertilizer is distributed evenly through the furrow or ridge of soil. The rate of delivery of the conduit is regulated by means of a sliding shutter, 34, operating over the apertures, 35, to close them more or less. By delivering the fertilizer in the top layer of soil before the latter passes through the last pair of rolls, a complete intermixture of the fertilizer with that layer of soil is secured. In some instances it may be desirable to fertilize the second layer instead of the top layer, or in addition to the top layer, and in some other instances a different fertilizer may be desired for different layers; and these different treatments can readily be obtained by providing a fertilizing conduit over any pair of rolls antecedent to the last pair, and providing such conduit with fertilizer in the manner already described. Such additional fertilizer-supplying devices are shown in dotted lines in Figure 2, and require no further description.

The particular character of pulverizing rolls shown, is believed to possess certain specific advantages. These rolls will now be described. As above partly stated, each pair of rolls comprises two similar frusto-conical rolls mounted with their axes parallel and with their slope in opposite directions, whereby their slant sides are also parallel. These rolls are connected for giving them all the same rotary speed, as, by a continuous train of equal gears, 100, on their shafts at one end. This causes the rolls of each pair to revolve toward each other at their proximate sides for feeding the soil downward between them. Having the same speed of rotation about their respective axes, the rolls of each pair have the same circumferential speed only at the middle point of their length, one roll having steadily increasing speed from that point out toward the larger end and the other similarly having increasing circumferential speed from the middle point out toward the opposite end of the pair of rolls. This causes the soil to be fed downward between the rolls with a grinding action by reason of the higher circumferential speed of one roll over that of the other at the point at which the soil is engaged between them; and this greatly increases the capacity of the rolls for finely pulverizing the soil. In order to cause the rolls to grip the soil for feeding it between them and at the same time feeding a stream of considerable thickness and grinding it up, the rolls are preferably covered with woven wire fabric shown at 82. This may be made of wire from one-sixteenth of an inch to an eighth of an inch in diameter, and from a half an inch to an inch mesh. These dimensions, however, may be modified according to experience and the degree of fineness to which it is desirable to reduce the soil.

The operating train of this mechanism comprises a wheel, 80, on a shaft 80$^a$, mounted upon the upper side of the frame, said wheel being driven by a chain or belt, 81, directly from a pulley or sprocket wheel, 81$^a$, on the motor shaft. A pulley, 83, on said shaft, 80$^a$, by means of a belt or chain, 84, passing around a pulley, 85, on the shaft, 22, drives the wire brush, 27. A pulley, 87, on said shaft, 22, by means of a chain, 88, around a sprocket wheel, 89, upon one of the drum heads, A$^3$, rotate the excavating drum. A sprocket wheel, 90, on the opposite end of the shaft, 80$^a$, from that on which the pulley, 83, is secured, drives the gear train 100, for the pulverizing rolls by means of a chain, 91, from said sprocket wheel, 90, extending around a sprocket wheel on the shaft of any one of the rolls of said pulverizing roll train which will thereby derive rotation in the proper direction, the remainder of the train being driven by the successive intermeshing of the gears, 100, thereof. From any convenient shaft, as from the shaft, 14$^d$, the endless rake, 23, is actuated by means of a sprocket wheel, 92, on said first mentioned shaft extending around a sprocket wheel on one end of the forward shaft of said endless rake.

When this machine is to be propelled over the ground to or from the place of work, the operator by means of the worm shaft, 20, will rotate the shaft, 15, causing the pinions, 16, to climb up along the segment racks, 17, until the excavator is lifted above the level of the ground,—that is, to a height at which it would be above the level of the ground when the wheels, 2, are at the bottom of the furrow. The machine then travels upon said wheels, 2, and upon the caster wheels, 3 and 4 the pole truck being swiveled to the frame in the usual manner at the forward end of the latter so as to steer the machine by turning the pole truck, and the wheels, 2, 2, operating in the usual manner of hind wheels of a wagon, said wheels being loose on their shaft, 2$^a$, and rolling independently of each other.

I claim:—

1. A machine for the purpose indicated mounted for travel, comprising means mounted thereon for excavating the soil, means for conveying the excavated soil rearward over the line of advance of the machine, and soil grinding or flouring means comprising a series of pairs of rolls; the conveying means being adapted for delivering the excavated soil between the rolls of the several pairs and the grinding or flouring means being adapted for depositing the ground or floured soil in the furrow of the excavation.

2. A machine for the purpose indicated, mounted for travel, comprising means mounted thereon for excavating the soil; means for conveying the excavated soil rearward over the line of advance of the machine, and soil grinding or flouring means; the excavating means being adapted for removing the excavated soil forwardly and upwardly from the plow; means for deflecting the stream of soil thus excavated rearwardly over the excavating means; the conveying means comprising an element operating under the rearwardly deflected stream of excavated soil for initially propelling said soil rearwardly to the grinding and flouring means, the latter means being adapted for depositing the ground or floured soil in the furrow.

3. A machine for cultivating the soil mounted for travel, comprising means mounted thereon for excavating the soil; means for conveying the excavated soil rearward over the line of advance of the machine; and soil grinding or flouring means; said conveying means being adapted for delivering the soil to said grinding or flouring means, and the latter means being adapted for depositing the ground or floured soil in the furrow of the excavation; the grinding or flouring means comprising frusto-conical rolls arranged in pairs, the two of each pair having the same taper and being tapered in opposite directions and having their axes parallel, and means for revolving them toward each other at their proximate sides.

4. In a machine for cultivating the soil, comprising means mounted thereon for excavating the soil; means for conveying the excavated soil rearward over the line of advance of the machine, and soil grinding or flouring means; said conveying means being adapted for delivering the soil to said grinding or flouring means, and the latter means being adapted for depositing the ground or floured soil in the furrow of the excavation; the means for grinding or flouring the soil comprising rolls in pairs, the two of each pair revolving toward each other for engaging and feeding the soil between them; said rolls having their cooperating surfaces covered with woven-wire fabric for engaging the soil.

5. A machine for cultivating the soil, mounted for travel, comprising means mounted thereon for excavating the soil; means for conveying the excavated soil rearward over the line of advance of the machine, and soil grinding and flouring means; said conveying means being adapted for delivering the soil to said grinding or flouring means, and the latter means being adapted for depositing the ground or floured soil in the furrow of the excavation; the means for grinding or flouring comprising frusto-conical rolls in pairs, the two of each pair having the same taper in opposite directions and mounted with their axes parallel, and being longitudinally movable with respect to each other and yielding means resisting such movement, whereby the rolls are adapted to separate yieldingly to permit uncrushable objects to pass between them.

6. A machine for cultivating the soil mounted for travel comprising means mounted thereon for excavating the soil; means for conveying the excavated soil rearward over the line of advance of the machine, and soil grinding or flouring means, said conveying means being adapted for delivering the soil to said grinding or flouring means, said grinding or flouring means being adapted for depositing the ground or floured soil in the furrow of the excavation; a roller mounted at the rear of the machine for rolling over the soil to re-deposit it in the furrow for compacting the same; means for mounting said roller, comprising a frame pivoted at its forward end for rising and falling at its rear end in which the roller is mounted; a frame for a driver's seat pivoted at its rear end and extending along above the roller carrying frame, and struts extending between the two pivoted frames and adjustable along them both for varying their lever relations to each other.

7. A machine for cultivating the soil mounted for travel, comprising means mounted thereon for excavating the soil; means for conveying the excavated soil rearward over the line of advance of the machine, and soil grinding or flouring means; said conveying means being adapted for delivering the soil to said grinding or flouring means, said grinding or flouring means being adapted for depositing the ground or floured soil in the furrow of the excavation; and carrying wheels for the machine mounted for tracking in the bottom of the furrow.

8. A machine for cultivating the soil mounted for travel, comprising means mounted thereon for excavating the soil; means for conveying the excavated soil rearward over the line of advance of the machine, and soil grinding or flouring means; said conveying means being adapted for delivering the soil to said grinding or flouring means, said grinding or flouring means being adapted for depositing the ground or floured soil in the furrow of the excavation; said machine and frame structure having carrying wheels mounted thereon for tracking in the bottom of the furrow, the excavating device being mounted for being raised and lowered with respect to the carrying wheels.

9. A machine for cultivating the soil mounted for travel, comprising means mounted thereon for excavating the soil; means for conveying the excavated soil rearward over the line of advance of the machine, and soil grinding or flouring means; said conveying means being adapted for delivering the soil to said grinding or flouring means, said grinding or flouring means being adapted for depositing the ground or floured soil in the furrow of the excavation; the excavating means being adapted for rotating upward at the forward side for discharging the excavated soil upward in front of the excavator.

10. A machine for cultivating the soil mounted for travel, comprising means mounted thereon for excavating the soil; means for conveying the excavated soil rearward over the line of advance of the machine, and soil grinding or flouring means; said conveying means being adapted for delivering the soil to said grinding or flouring means, said grinding or flouring means being adapted for depositing the ground or floured soil in the furrow of the excavation; a machine comprising a frame structure having carrying wheels mounted thereon for tracking on the bottom of the furrow formed by the excavating devices behind the latter, and the conveying and pulverizing devices being extended rearwardly of the position of the carrying wheel for delivering the soil into the furrow behind said wheels, and a motor for actuating said excavating and pulverizing device mounted upon the frame at a point forward of said carrying wheels for counter-balancing the portion of the mechanism which is rearward thereof.

11. A machine for the purpose indicated, mounted for travel, comprising means mounted thereon for excavating the soil and forming a furrow; means for elevating the excavated soil above the furrow for delivery downward and rearward; means for propelling the soil thus delivered rearward above the furrow; means for separating the soil into a plurality of portions during its rearward propulsion; means for furnishing fertilizer and seed to selected portions; means for grinding said several portions separately and delivering them after grinding successively one behind another in the furrow; whereby the ground soil is deposited in layers and selected layers are fertilized and seeded.

12. The process of cropping soil which comprises the following steps: (1) excavating the soil and forming a furrow; (2) elevating the excavated soil above the furrow for delivery downward to a conveyer; (3) propelling the soil thus delivered rearward above the furrow; (4) separating the soil into a plurality of portions during its rearward propulsion; (5) delivering fertilizer and seed to selected portions; (6) grinding all the separated portions separately and delivering them successively one behind another in the furrow.

13. The process of cropping soil which consists in the following steps: (1) excavating and removing the soil to form a furrow; (2) carrying the soil along the furrow with the excavating apparatus, and grinding it while thus carrying it; (3) intermixing fertilizer with the soil in the process of grinding it and carrying it; (4) separating portions of the excavated soil from the remainder in the process of carrying it, and intermixing seed with certain of said separated portions, and (5) depositing the ground fertilized and seeded soil in the furrow.

14. A machine for the purpose indicated, comprising in combination with a frame structure mounted for travel, excavating devices for cutting a furrow in the soil and lifting the soil therefrom, conveying devices for carrying the excavated soil rearward in the line of advance of the machine; soil-pulverizing devices to which the lifted and rearwardly-conveyed soil is delivered and from which it is discharged into the furrow, and devices associated with the conveying and pulverizing devices for supplying fertilizer to the soil before the completion of the pulverizing, whereby fertilizer is mixed with the soil in the pulverizing process.

15. A machine for the purpose indicated, comprising in combination with a frame structure mounted for travel, excavating devices for cutting a furrow in the soil and lifting the soil therefrom; conveying devices for carrying the excavated soil rearward over the line of advance; soil-pulverizing devices to which the lifted and rearwardly-conveyed soil is delivered and from which it is discharged into the furrow, and devices associated with the conveying and pulverizing devices for supplying seed to the soil before the completion of pulverizing; whereby seed is mixed with the soil in the pulverizing process.

16. A machine for the purpose indicated, comprising in combination with a frame structure mounted for travel, excavating devices for cutting a furrow in the soil and lifting the soil therefrom; conveying devices for carrying the excavated soil rearward over the line of advance of the machine; soil pulverizing devices to which the lifted and rearwardly-conveyed soil is lifted and from which it is discharged into the furrow; means for depositing the pulverized soil into the furrow, and devices associated with the depositing means for supplying seed to the soil before it is deposited in the furrow.

17. In a machine for the purpose indicated, excavating devices for disintegrating and removing the soil and leaving a furrow consisting of a multiplicity of toothed discs of saw-like character mounted obliquely on a common axis, and means for rotating them together about such axis, such discs being spaced apart at their peripheries a distance approximately the width of the path of rotation of the periphery of each, whereby each of said discs operates to cut a portion of the furrow greater in width than the thickness of the disc itself.

18. A machine for the purpose indicated comprising in combination with a frame structure mounted for travel; excavating devices for cutting a furrow in the soil; a series of pulverizing devices arranged one behind another over the furrow; conveying means for distributing the excavated soil to said pulverizing device, and means for delivering the pulverizer to a selected one or more of said devices.

19. A machine for the purpose indicated, comprising in combination with a frame structure mounted for travel, excavating devices for cutting a furrow in the soil; a series of pulverizing devices arranged one behind another over the soil; conveying means for distributing the excavated soil to said pulverizing devices, and means for delivering seed to a selected one of said pulverizing devices to the exclusion of the remainder.

20. A machine for the purpose indicated, comprising in combination with a frame structure mounted for travel; excavating devices for cutting a furrow in the soil; a series of pulverizing devices arranged for discharge one behind another over the furrow; means for distributing the excavated soil to said pulverizing devices, whereby the soil is deposited in the furrow in a succession of layers one for each of the pulverizing devices, and means for delivering through a selected one or more of said pulverizing devices to the exclusion of the remainder of other material beside said soil; whereby such other material is deposited in a selected strata of the contents of the re-filled furrow.

21. A machine for the purpose indicated, comprising means mounted thereon for excavating the soil and forming a furrow; means for elevating the excavated soil above the furrow and conveying it rearward; means for separating the excavated soil into a plurality of portions; a plurality of soil-grinding and flouring means to which respectively the several portions of excavated soil are delivered, said grinding and flouring means being positioned and adapted for delivering the ground or floured soil into the furrow.

22. A machine for the purpose indicated, mounted for travel, comprising means mounted thereon for excavating the soil; means for conveying the excavated soil rearward over the line of advance of the machine and a plurality of soil-grinding or flouring means adapted and arranged to receive each a portion of the excavated and rearwardly-conveyed soil for grinding and flouring, and the conveying means being adapted for delivering by the excavated soil to the several grinding or flouring means up to the capacity of each for grinding or flouring, whereby the entire quantity of excavated soil is divided up and distributed to the several grinding or flouring means for being ground or floured separately by said several means; the grinding and flouring means being adapted for depositing the ground or floured soil in the furrow of the excavation.

23. In the construction defined in claim 16, foregoing, the several grinding or flouring means being arranged successively one behind another along the line of travel and above the furrow, whereby the ground or floured soil delivered from said several means is deposited in the furrow in successive layers.

In testimony whereof, I have hereunto set my hand at Chicago, Illinois, this 19th day of September, 1917.

CHARLES S. BURTON.